Figure 1:
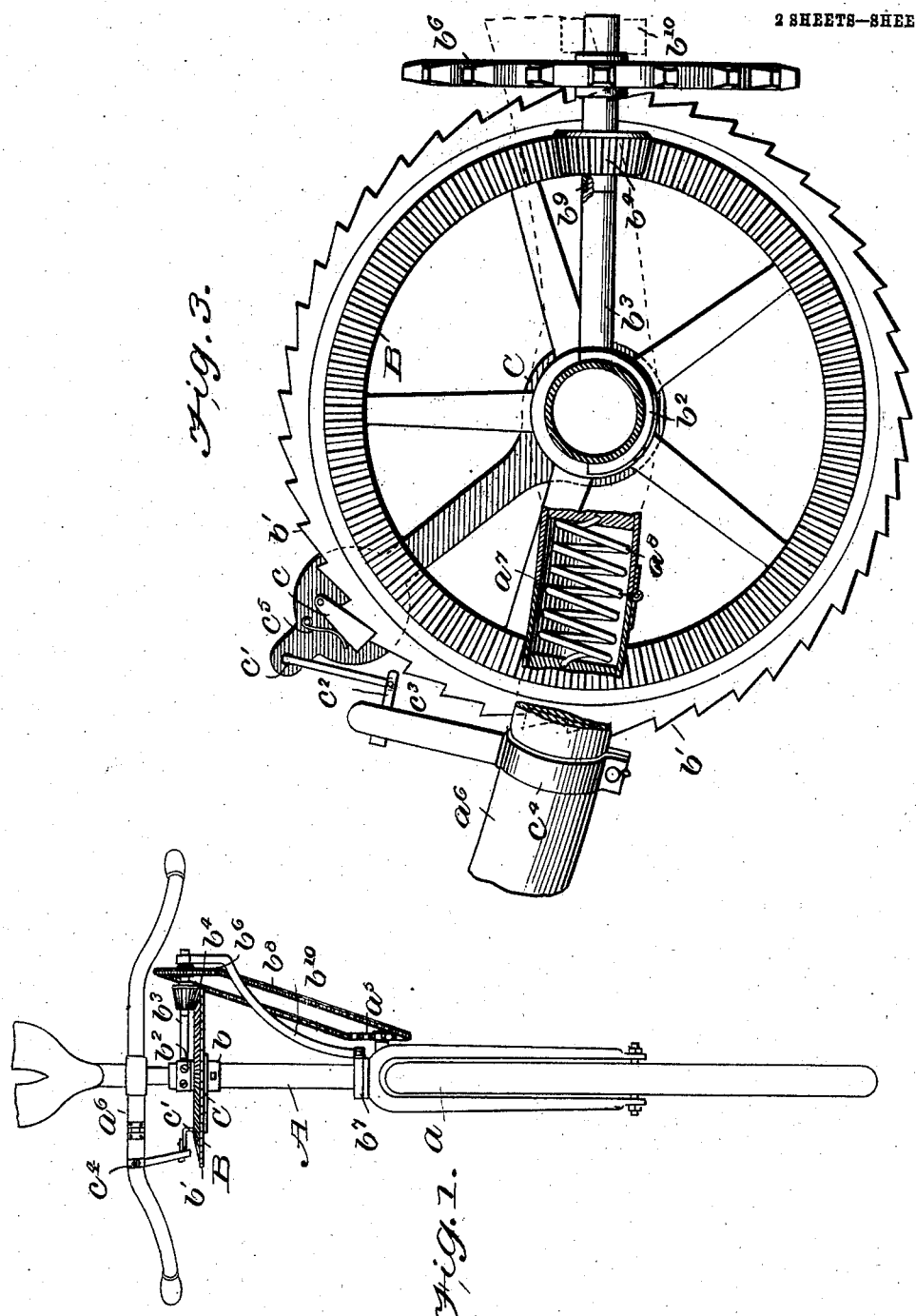

No. 850,746.

PATENTED APR. 16, 1907.

H. GARZA.
BICYCLE.
APPLICATION FILED OCT. 10, 1906.

2 SHEETS—SHEET 2.

Fig. 2.

WITNESSES
F. C. Barry
C. E. Trainor

INVENTOR
HILDEBRANDO GARZA
BY Munn & Co.
ATTORNEYS

UNITED STATES PATENT OFFICE.

HILDEBRANDO GARZA, OF MONTEREY, MEXICO.

BICYCLE.

No. 850,746.　　　Specification of Letters Patent.　　Patented April 16, 1907.

Application filed October 10, 1906. Serial No. 338,262.

*To all whom it may concern:*

Be it known that I, HILDEBRANDO GARZA, a citizen of the Republic of Mexico, and a resident of Monterey, in the State of Nuevo Leon, Republic of Mexico, have made certain new and useful Improvements in Bicycles, of which the following is a specification.

My invention is an improvement in bicycles, and consists in certain novel constructions and combinations of parts hereafter described and claimed.

Figure 2:
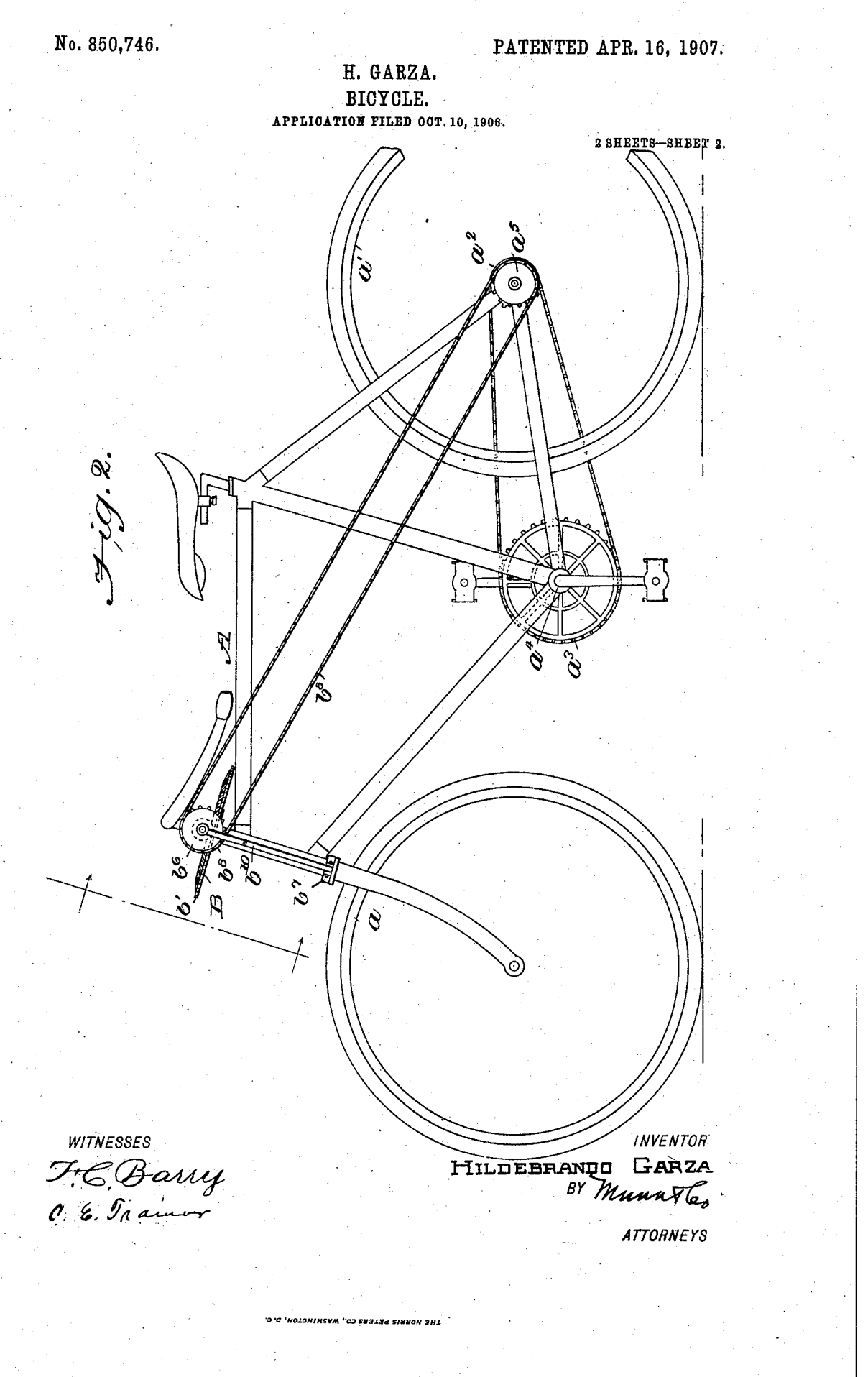

Referring to the drawings forming a part hereof, Figure 1 is a front view of a bicycle provided with my improvements. Fig. 2 is a side view of Fig. 1. Fig. 3 is a top plan view of the auxiliary propelling mechanism.

In the present embodiment of my invention the bicycle, comprising the frame A, the front wheel $a$, and the rear wheel $a'$, is provided with any suitable driving mechanism, such as the sprocket $a^2$, connected with the rear wheel and driven by a chain $a^3$ from the ordinary crank-shaft $a^4$.

A bevel gear-wheel B is journaled upon the front fork of the bicycle and is supported by a collar $b$, secured to the front fork in any suitable manner, the periphery of the gear-wheel being provided with ratchet-teeth $b'$ for a purpose to be hereafter described.

A bracket $b^2$ is secured to the front fork above the gear-wheel in any suitable manner, and the said bracket is provided with a horizontally-projecting arm $b^3$, the said arm having a reduced end upon which is loosely journaled a sleeve $b^9$, provided with a bevel-gear $b^4$, meshing with the bevel gear-wheel B and with a sprocket-wheel $b^6$, connected by a sprocket-chain $b^8$ with a sprocket-wheel $a^5$, secured to the rear wheel. The outer end of the arm $b^3$ is supported by a bracket $b^{10}$, the lower end of the bracket being connected to a ring $b^7$, encircling the front fork at the junction of the arms with the body portion thereof.

A pawl-arm C is loosely mounted on the front fork between the gear-wheel B and the collar $b$, and to the said pawl-arm is pivoted a pawl $c$, engaging the ratchet-teeth on the gear-wheel B, the pawl being retained normally in engagement with the teeth by a spring $c^5$. One side of the handle-bar $a^6$ is divided, as at $a^7$, the sections of the handle-bar being hinged together to permit the outer section to swing with respect to the inner section in a horizontal plane, and a spring $a^8$ is arranged within the handle-bar at the junction of the sections for normally retaining the outer section in alinement with the inner section. A link $c'$ is pivoted to the outer end of the pawl-arm by one end and has its other end pivoted to a lug $c^2$ of a bracket $c^3$, having one of its ends provided with a clamp $c^4$, clamped upon the movable section of the handle-bar.

In operation my auxiliary propelling mechanism is actuated by the swinging of the outer section of the handle-bar, it being evident that when the section is swung forwardly the gear-wheel will be rotated and when the said section is swung rearwardly the pawl will slip idly over the ratchet-teeth. The rotation of the horizontal gear-wheel is imparted through the gear-wheel $b^4$ to the sprocket-wheel $b^6$ and by the chain $b^8$ and sprocket-wheel $a^5$ to the rear wheel $a'$.

It will be observed that the spring $a^8$ retains the sections of the handle-bar normally in alinement with each other, a construction which obviates the interference of the joint in steering.

I claim—

1. The combination with the bicycle and the driving mechanism therefor, of a handle-bar comprising a plurality of sections pivotally connected, a bevel gear-wheel having ratchet-teeth on the periphery thereof loosely journaled on the front fork, a horizontal shaft secured to the fork above the bevel-wheel, a sleeve loosely journaled on the horizontal shaft and provided with a sprocket-wheel and with a bevel-gear meshing with the horizontal bevel-gear, a sprocket-wheel on the rear wheel of the bicycle, a sprocket-chain connecting said sprocket-wheel and the sprocket-wheel on the sleeve, a pawl-arm loosely mounted on the front fork, a spring-pressed pawl for engaging the ratchet-teeth of the bevel-gear, and a link connecting the pawl-arm with the movable section of the handle-bar.

2. The combination with the bicycle and the driving mechanism therefor, of an auxiliary driving mechanism comprising a bevel-gear loosely journaled on the front fork, and provided on its periphery with ratchet-teeth, a horizontal shaft arranged above the bevel gear-wheel and provided with a bevel-gear meshing therewith, a sprocket-wheel rigid with said last-named bevel-gear, a sprocket-wheel on the rear wheel of the bicycle, a sprocket-chain connecting said sprocket-wheels, a handle-bar comprising a plurality of pivotally-connected sections, a pawl-arm having a pawl for engaging the ratchet-teeth of the bevel gear-wheel, and a connection between the movable section of the handle-bar and the pawl-arm.

3. The combination of the bicycle having a handle-bar provided with a movable section, of a bevel-gear loosely journaled on the front fork, and provided on its peripheral surface with ratchet-teeth, a pawl-arm having a pawl for engaging the ratchet-teeth, a link connecting the movable section of the handle-bar and the pawl-arm, and a connection between the bevel-gear and a wheel of the bicycle, for transmitting motion thereto.

4. The combination of the bicycle having a handle-bar provided with a movable section, driving mechanism for the bicycle, means connected with the movable section of the handle-bar for actuating the driving mechanism, and means for normally retaining the sections of the handle-bar in alinement.

HILDEBRANDO GARZA.

Witnesses:
J. MIO GAENIDO,
F. J. GUERRA.